United States Patent
Cosentino et al.

(10) Patent No.: US 7,149,635 B2
(45) Date of Patent: Dec. 12, 2006

(54) SEAL FORCE MONITOR APPARATUS, SYSTEM, AND METHOD FOR IN-PROCESS DETERMINATION OF INTEGRITY OF SEALED CONTAINERS

(75) Inventors: Juan L. Cosentino, Lincoln University, PA (US); Ronald Newman, Downingtown, PA (US); Bruce D. Smith, West Chester, PA (US)

(73) Assignee: Genesis Machinery Products, Inc., Exton, PA (US)

( * ) Notice: Subject to any disclaimer, the term of this patent is extended or adjusted under 35 U.S.C. 154(b) by 0 days.

(21) Appl. No.: 11/040,705

(22) Filed: Jan. 21, 2005

(65) Prior Publication Data

US 2005/0177322 A1    Aug. 11, 2005

Related U.S. Application Data

(60) Provisional application No. 60/538,728, filed on Jan. 23, 2004.

(51) Int. Cl.
*G01L 1/00*    (2006.01)

(52) U.S. Cl. .............................. 702/42; 702/33; 702/41; 702/81; 702/82

(58) Field of Classification Search .................. 702/42, 702/33, 41, 81, 82; 700/108, 109
See application file for complete search history.

(56) References Cited

U.S. PATENT DOCUMENTS

| | | | | |
|---|---|---|---|---|
| 2,689,647 A * | 9/1954 | Hofstetter et al. | .......... | 209/529 |
| 3,469,689 A * | 9/1969 | O'Neill, Jr. | ................. | 209/529 |
| 4,213,329 A * | 7/1980 | Raymond et al. | ............... | 73/52 |
| 4,511,044 A * | 4/1985 | Connor et al. | .............. | 209/522 |
| 6,524,230 B1 * | 2/2003 | Harding et al. | ................ | 493/8 |
| 6,591,222 B1 * | 7/2003 | Stiner | ........................ | 702/173 |

* cited by examiner

*Primary Examiner*—Marc S. Hoff
*Assistant Examiner*—Phuong Huynh
(74) *Attorney, Agent, or Firm*—Eugene E. Renz, Jr.

(57) ABSTRACT

A method, apparatus, and system for determining the integrity of a sealed container utilizing one or more force signals which are converted into absolute force units is disclosed, providing a method that uses quantitative parameters, and can be validated. The force signals are measured in multiple data collection channels, and can be individually enabled or disabled by an operator to facilitate machine setup and troubleshooting. A user interface provides a display showing the force applied during the container-sealing process, as well as summary information regarding the status of multiple container-sealing machines in a production line.

9 Claims, 6 Drawing Sheets

SEAL FORCE MONITOR APPARATUS, SYSTEM, AND METHOD FOR IN-PROCESS DETERMINATION OF INTEGRITY OF SEALED CONTAINERS

This application claims the benefit of U.S. Provisional Patent Application No. 60/538,728 filed Jan. 23, 2004, incorporated by reference herein.

FIELD OF THE INVENTION

The present invention relates to method, apparatus, and system for determining the integrity of sealed containers. More particularly, the present invention pertains to a quantitative method for confirming the seal of rigid containers. These containers are typically used for pharmaceutical products, and therefore, it is desirable to use a quantitative method that can be validated independently of a particular known sample.

BACKGROUND OF THE INVENTION

Various devices exist for the testing of sealed packages. These techniques include methods of optical inspection via cameras or lasers, as well as the analysis of signals from force or pressure gauges to make a determination of seal quality. The variation of force over time during the sealing process is referred to as a force profile. Various systems exist which ensure seal integrity has been ascertained by comparing the force profile used in sealing a container to that of a reference signal. This has the disadvantage of requiring a known sample to define the sealing process. Furthermore, it can be difficult to describe in numbers the various manual adjustments required in the set-up of an automatic container-sealing machine. The nature of the pharmaceutical industry warrants manufacturing processes that can be validated. The manufacturing process must be reproducible, and consistently perform as intended. Therefore, there exists a need for a method, apparatus, and system to define a container-sealing process in a manner described quantitatively, and with a high degree of repeatability.

The disclosure of U.S. Pat. No. 4,511,044 is incorporated by reference herein, to the extent not inconsistent herewith.

SUMMARY OF THE INVENTION

This invention relates to a method, apparatus, and system for determining the integrity of a sealed container. It is particularly well suited for parenteral pharmaceutical products.

One feature of the present invention uses absolute force units, such as pounds, to define the sealing force used to seal the container. Therefore, the criteria used to define a properly sealed container can be completely specified without need for a known good sample.

Another feature of this invention is the use of multiple force monitoring that can be independently enabled or disabled. This facilitates convenient troubleshooting of the container sealing machinery. By selectively disabling channels, an operator can determine which phase of the sealing process is out of range. This feature is useful for identifying a faulty force sensor, or identifying a particular zone where mechanical causes, such as debris in the travel path of the containers, are preventing the proper sealing force from being applied.

Another feature of this invention is a user interface that indicates force applied at each force-monitoring channel.

Another feature of this invention is a user interface that displays the status of multiple transport systems on one screen, serving as a convenient way for an operator to monitor a production line with multiple transport systems.

DETAILED DESCRIPTION

Figure 1:
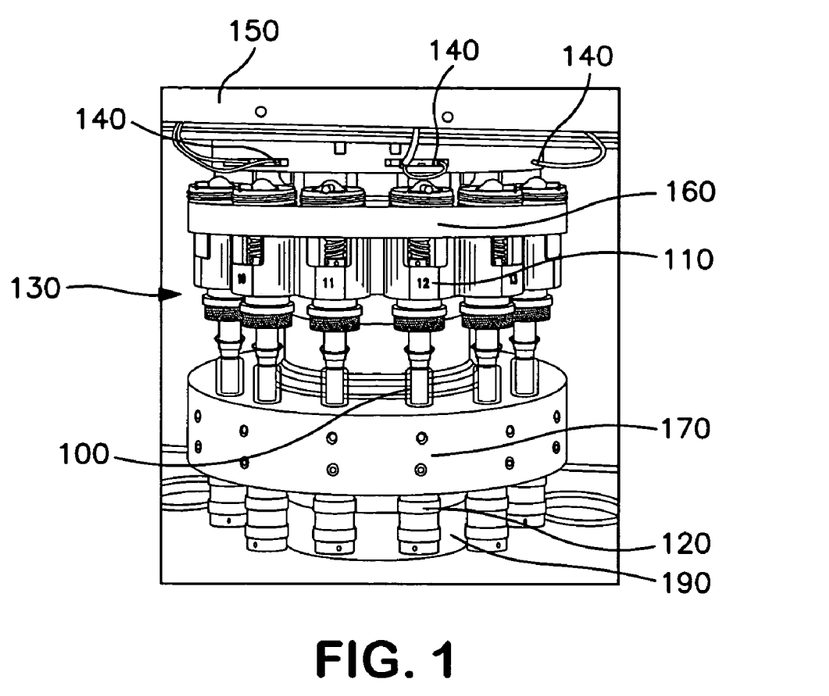
FIG. 1 shows a container sealing apparatus incorporating the detection system of the present invention.

FIG. 1 shows a container sealing apparatus incorporating the detection system of the present invention. A container undergoing the sealing process is shown as reference 100. In the embodiment shown, a force is exerted on the container 100 from above by a top compression element 110 and from below by a bottom compression element 120. The container 100 rests on a platform 170 which houses the bottom compression element 120. The top compression element 110 is suspended above the container 100 by a top rail 160. The platform 170, top rail 160, bottom compression element 120, and top compression element 110 comprise a transport system, generally referred to as 130. The transport system 130 is mounted on a base 190, and underneath a stationary block 150. As shown in this figure, the containers pass through the conveyer system from right to left. As they do so, a varying amount of force is applied to the seal by the top compression element 110 and bottom compression element 120.

At various intervals along the path of travel, the top compression element 110 makes contact with a force sensor 140 mounted on a stationary rail 150 which rests above the transport system 130. During the time period where the contact is made, the force sensor 140 produces a signal which can be represented in terms of absolute force units such as pounds or kilograms. The force sensor can be implemented in a variety of ways, including using devices such as; load cell, strain gauge, or one or more piezoelectric transducers.

Figure 2:
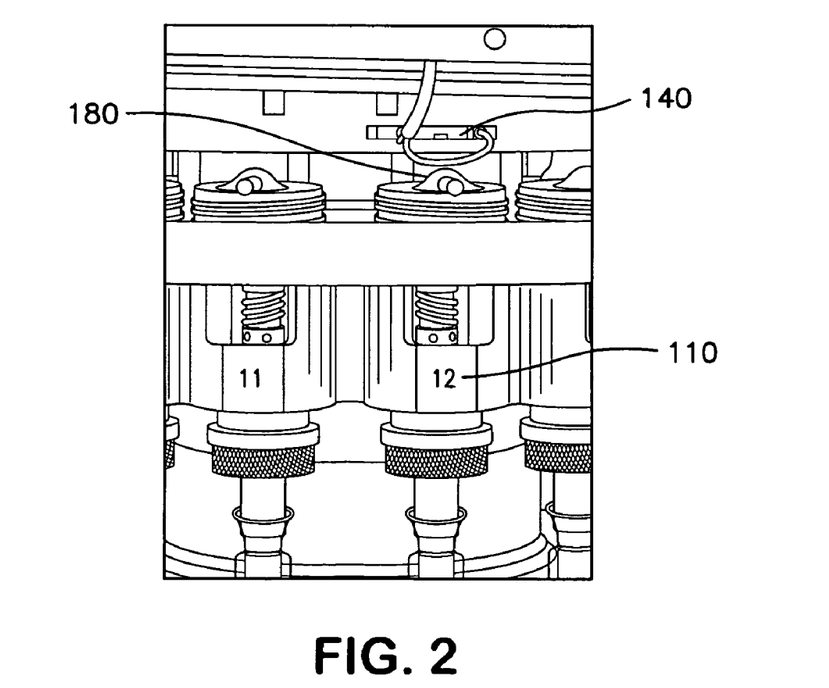
FIG. 2 shows detail of the force monitoring mechanism of the embodiment shown in FIG. 1.

FIG. 2 shows detail of the force monitoring mechanism of the embodiment shown in FIG. 1. The top compression member 110 contains a bearing 180 that provides mechanical contact with the force sensor 140, while facilitating relatively horizontal motion of the compression element.

Figure 3:
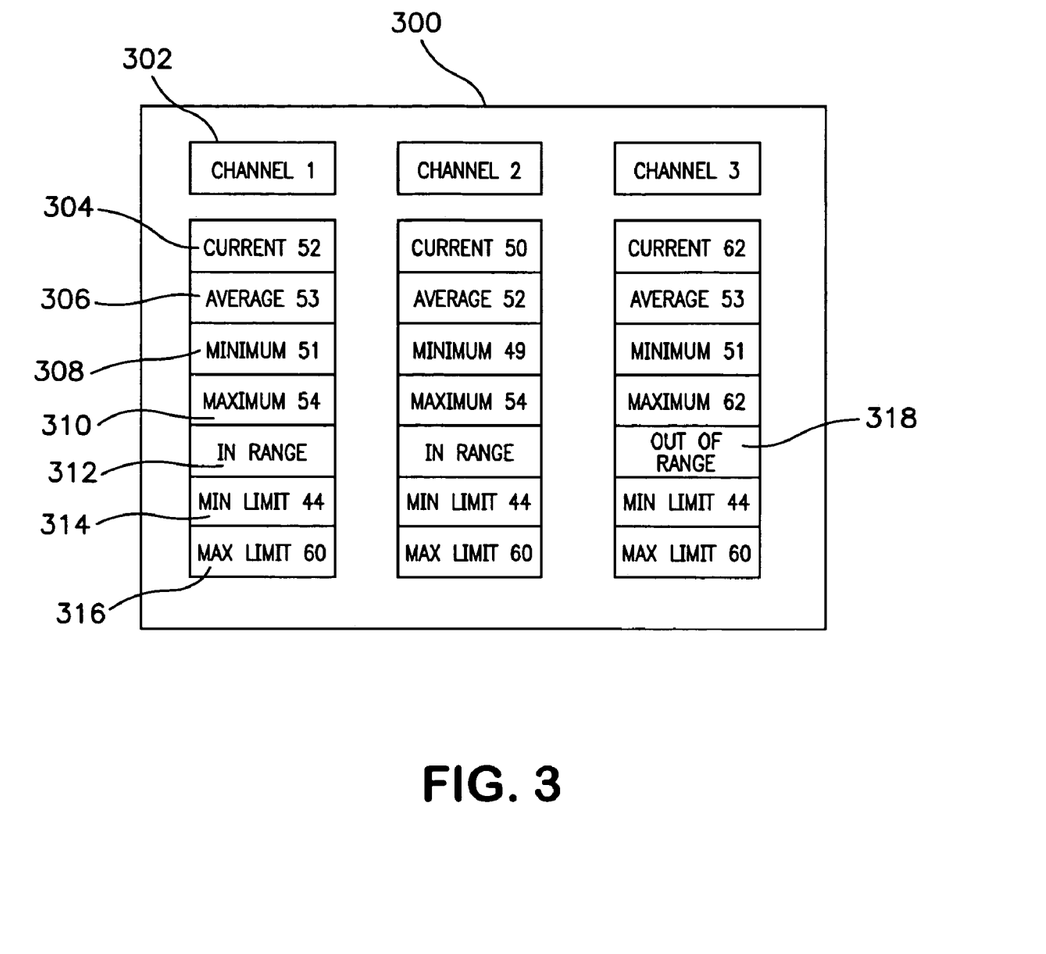
FIG. 3 shows an exemplary user interface screen of the present invention for monitoring the force levels.

FIG. 3 shows an exemplary user interface screen 300 of the present invention for monitoring the force levels. The screen presents a variety of data regarding one or more channels of the seal force monitor system. The channel indicator 302 shows which channel is associated with the data displayed below. Item 304 shows the current force detected by the force sensor. Item 306 shows the average of a pre-determined number of readings from the force sensor during the course of operation. Item 308 shows the minimum force reading from the force sensor during the course of operation. Item 310 shows the maximum force reading from the force sensor during the course of operation. Item 312 is an indication that the current force shown in item 304 has not gone outside the specified range. Item 314 shows the user setting for the minimum acceptable force used during the sealing process for the channel indicated in the channel indicator 302. Item 316 shows the user setting for the maximum acceptable force used during the sealing process for the channel indicated in the channel indicator 302. Item 318 is an indication that the current force, shown in item 304 has gone outside the specified range, and represents a failure condition.

Figure 4:
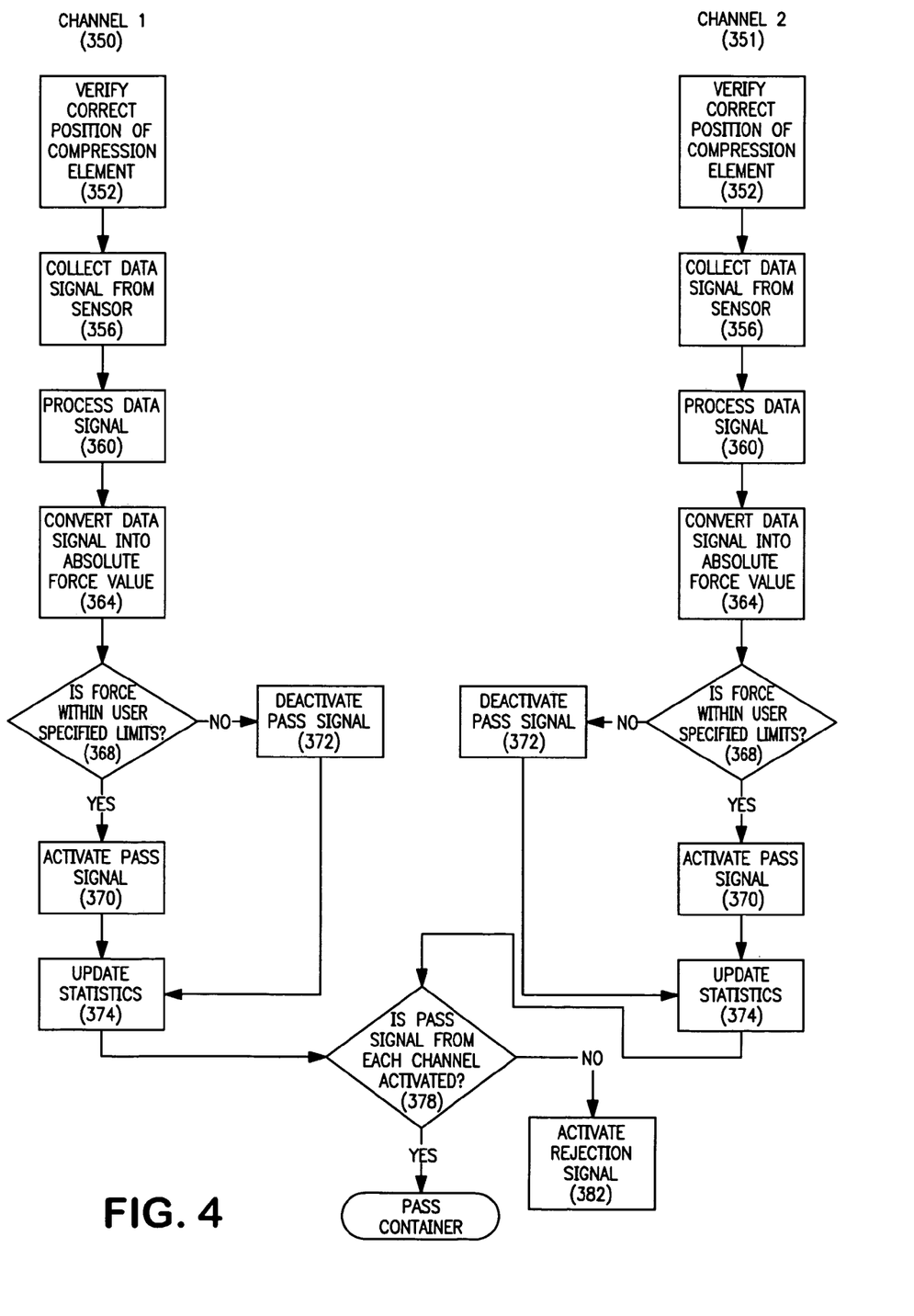
FIG. 4 is a flowchart showing the multiple channel seal force monitor algorithm.

FIG. 4 is a flowchart showing the multiple channel seal force monitor algorithm. In this exemplary flowchart, there are force evaluations performed for two channels; channel 1, referred to as 350, and channel 2, referred to as 351. Similar processing is performed for each channel. The details for channel 1 apply also to channel 2, and any other channels that may be employed in an embodiment of the present invention. Referring now to channel 1 processing section 350, the compression element is detected to be in the correct position with sufficient mechanical contact with the force sensor of the corresponding channel in step 352. There is a range of acceptable positions. This range is defined by the position detection means that monitors the position of the compression element with respect to the force sensor. This position detection means can be accomplished by a variety of devices known in the art, including position encoders, limit switches, and optical sensors. Once the compression element position is determined to be such that is in sufficient contact with the force sensor, data is collected from the force sensor in step 356. This data is typically in the form of an analog signal representative of the displacement of the compression element. In step 360, the data signal is processed. This processing may include amplification, filtering, noise cancellation, and digitizing to convert the signal into a format that can be digitally processed via a microprocessor device. In step 364, this processed signal is converted to an absolute force unit such as pounds or kilograms. In step 368 this force is compared to the minimum and maximum limits established for this channel. If the force is within the specified limits, a PASS signal is activated in step 370. If, in step 368, the force is determined to be outside the specified limits, the PASS signal is deactivated in step 372. Regardless of the result determined in step 368, the inspection statistics are updated in step 374. In step 378, a logical "AND" operation is performed with the PASS signal of all channels present in the system. If all PASS signals have been activated, the container is deemed to have passed the seal inspection. If a PASS signal from at least one channel is not activated, the container is deemed to have failed the seal inspection, and a rejection signal is activated in step 382. This signal can serve to activate a rejection mechanism that routes the defective container to a reserved area, thus serving to separate it from the containers that have passed the seal inspection.

Figure 5:
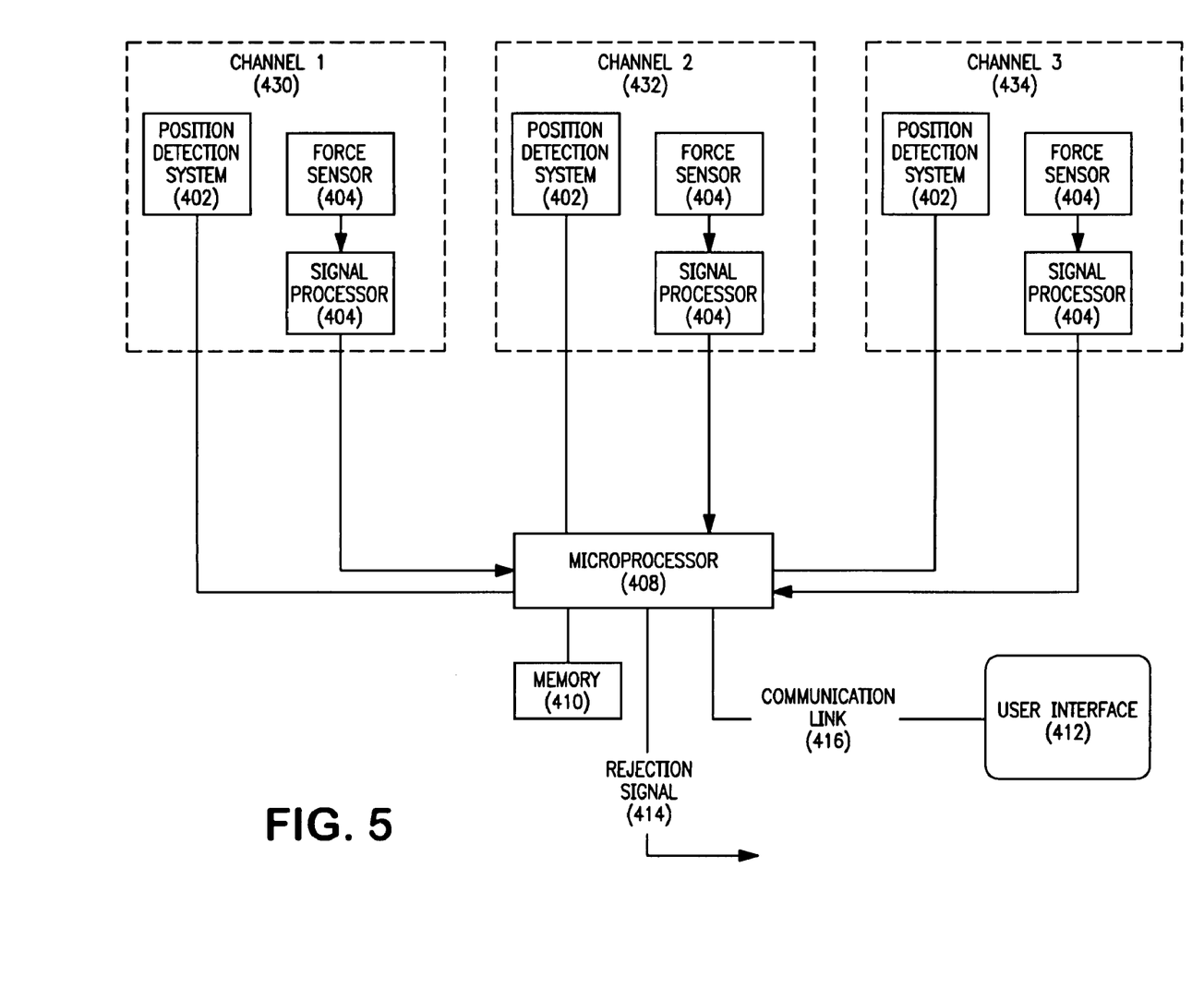
FIG. 5 is a system block diagram of an embodiment of the present invention.

FIG. 5 is a system block diagram of an embodiment of the present invention. This figure shows three channel-processing blocks, indicated as items 430, 432, and 434. The elements within each channel-processing block are similar. Item 402 is a position detection system. This provides a signal to a microprocessor 408, which is processing program instructions and data stored in memory 410. The force sensor 404 provides a signal representative of the displacement of the compression element. This signal is processed by the signal processor block 406 to convert it into a form suitable for interpretation by the microprocessor 408. The microprocessor receives input from the user, and provides feedback to the user via the user interface 412. This user interface comprises one or more display screens. It may optionally contain an audio device such as a speaker, buzzer, or chime. It may optionally contain one or more lights, which can illuminate or flash to indicate certain conditions, such as excessive defective containers. The user interface also comprises a data entry means for a user to enter data into the system. This means may include elements such as a keyboard, mouse, and/or touch screen. The user interface may also optionally contain a mechanism to read and/or write a data storage medium such as a floppy disk, memory card, compact disk drive, or other data storage mechanism. The user interface-microprocessor communication link 416 used to communicate with the microprocessor, may comprise internal busses. Alternatively, the user interface may communicate with the microprocessor via a remote communication protocol, including a serial protocol, a networked protocol, such as Ethernet, or Internet Protocol, or a wireless communication protocol. The microprocessor 408 compares signals from each channel-processing block and performs an evaluation based on the limits input by a user. If at least one of these evaluations is deemed to be out of the specified range, a rejection signal 414 is activated. This rejection signal can serve to activate a reject mechanism that routes the defective container to a reserved area, thus serving to separate it from the containers that have passed the seal inspection. If necessary, the activation of the rejection signal may be delayed by a pre-determined period to allow the faulty container to reach the rejection mechanism. While the block diagram shows various elements as separate, it is possible that some elements may be contained within a single discrete component. For example, a particular microprocessor may have signal processing, and/or memory, integrated into the microprocessor device.

Figure 6:
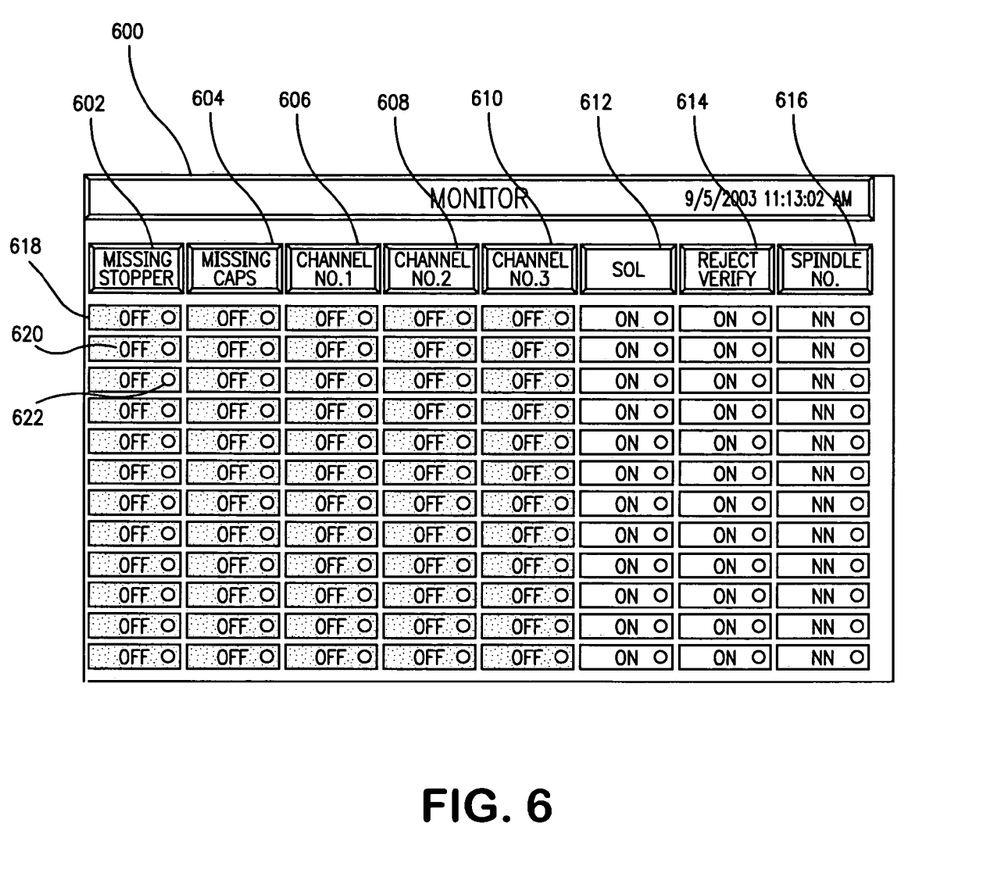
FIG. 6 is another exemplary user interface of the present invention that shows monitor screen with summary information for multiple transport systems.

FIG. 6 is another exemplary user interface of the present invention that shows monitor screen with summary information for multiple transport systems. It is generally referred to as item 600. This screen contains several columns. The missing stopper column 602 and missing caps column 604 are based on indications from other inspection equipment that is often used in a production line with a container sealing machine. Columns 606, 608, and 610 indicate if each force-monitoring channel is enabled. Column 612 indicates if the rejection solenoid is powered. Column 614 indicates if the rejection system is enabled. Column 616 indicates an instance of a transport mechanism, referred to in this user screen as a "spindle". Each column is composed of a plurality of status indicators 618. Each status indicator 618 contains a text portion 620. Some status indicators also have an icon portion 622. The text portion 620 of the status indicator 618 may contain wording such as "on" or "off" to reflect if a feature is enabled or disabled. Furthermore, the icon portion 622 may show a particular color, such as green, to indicate a feature is enabled, and another color, such as red, to indicate a feature is disabled. For the transport mechanism column 616, each status indicator shows a reference number pertaining to that transport system. Therefore, this allows the status of multiple transport systems to be viewed from one screen, serving as a convenient way for an operator to monitor a multiple-transport production line from one screen.

Figure 7:
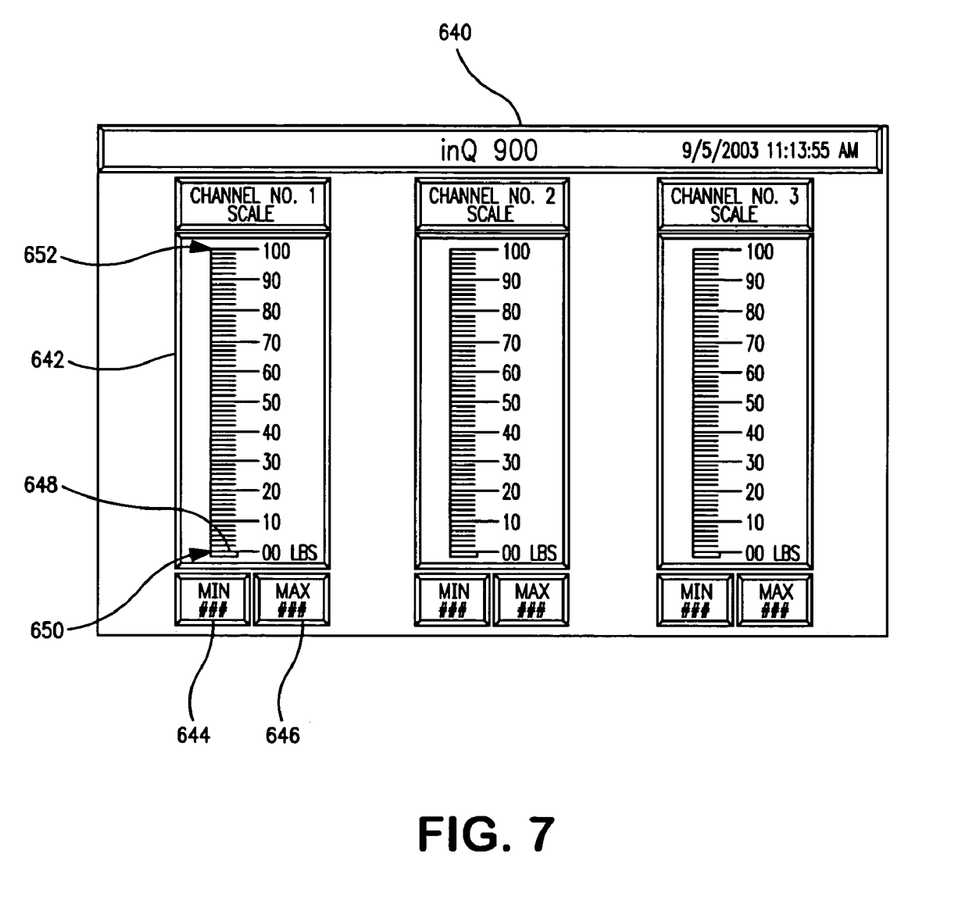
FIG. 7 is another exemplary user interface showing an alternative method for monitoring the force levels.

FIG. 7 is another exemplary user interface showing an alternative method for monitoring the force levels. It is generally referred to as item 640. In this embodiment, three force channels are being monitored. The elements comprising each channel monitoring display are similar. The current force readout 642 is rendered to resemble an analog scale. Item 648 is a marker indicating the current force. Item 650 is a marker indicating the minimum force limit. Item 652 is a marker indicating the maximum force limit. Below each current force readout 642 is a minimum force limit 644 which shows the minimum force reading from the force sensor during the course of operation, and a maximum force limit 646 which shows the maximum force reading from the force sensor during the course of operation.

OPERATION

The manner of using the present invention may include a step of calibrating the force sensors. This can be accomplished by applying a reference force to the sensors. For example, 100 pounds of force can be applied to the force sensors, the corresponding signal can then be stored as a reference signal. During normal operation, measured signals can be compared to this reference, and scaled to derive an absolute force reading. The comparison may be performed via an analog to digital conversion on each reference signal, and using a microprocessor to compare these digital values. Once the calibration process is complete, an operator may perform machine setup for a particular sized container.

For example, in a three-channel system, the parameters for sealing a specific type of container may be:

| CHANNEL NUMBER | RANGE (POUNDS) |
| --- | --- |
| Channel 1 | 40–45 |
| Channel 2 | 43–48 |
| Channel 3 | 45–50 |

This data may be input via the user interface. Alternatively, the data may be loaded from data stored in a data storage medium such as a floppy disk, memory card, CD ROM drive, or other data storage mechanism. This allows important machine setup data to be conveniently loaded from a stored record that defines the sealing parameters for a particular type of container. The system will use these values as a basis for accepting or rejecting a sealed container. If the container is rejected, a rejection signal is asserted. This rejection signal can be connected to a product flow direction mechanism, such as a solenoid, that pushes the defective container into a reserved area, thus serving to separate it from the containers that have passed the seal inspection.

Referring now to FIG. 6, the monitoring screen 600 shows various data pertaining to the production line. It consolidates information from other inspection equipment used in the production line, such as that for missing stoppers and missing caps. It shows the status of force monitoring channels and rejection mechanisms for multiple transport systems. In this embodiment of the user interface, the transport systems are referred to as "spindles". The user can select the details of the force monitoring system for a given transport system. FIG. 3 and FIG. 7 show exemplary embodiments of a display for monitoring the force channels of a given transport system.

The operator can disable any number of force-monitoring channels. This can be useful during setup or troubleshooting of the container-sealing machine. For example, by isolating the cause of failure to a particular channel, it may serve to indicate the source of the problem, such as debris in the travel path of the container, or a faulty force sensor.

CONCLUSION

Accordingly, the seal force monitoring apparatus, system, and method of the present invention provides the following benefits:
1) It uses absolute force units, such as pounds or kilograms, to define the sealing force used to seal the container. Therefore, the criteria used to define a properly sealed container can be completely specified without need for a known good sample.
2) It employs multiple force monitoring channels during the sealing process. This facilitates convenient troubleshooting of the container sealing machinery.
3) It provides a user interface that indicates force applied at each force-monitoring channel.
4) It provides a user interface that displays the status of multiple transport systems on one screen, serving as a convenient way for an operator to monitor a production line with multiple transport systems.
5) It provides a system for sealing containers that can be validated.

Although the description above contains many specific details, these should not be construed as limiting the scope of the invention, but merely as providing illustrations of some of the presently preferred embodiments of this invention.

For example, although the disclosed embodiment showed three force-monitoring channels, it is possible to have more or less force-monitoring channels within the scope of this invention. The disclosed embodiment showed the use of a position detection means to monitor the position of the compression element with respect to the force sensor. However, it is possible to have a force sensor integral to each compression element, oriented in such a way that travels with the compression element, thereby eliminating the need for position detection. In this arrangement, it is possible to provide constant force monitoring of every compression element. Furthermore, while the disclosed embodiment showed dual compression elements for each container, it is also possible to use a single compression element. Regardless of if the container-sealing machine uses single, or dual compression elements, this invention can be used to inspect containers during the sealing process.

The disclosed embodiment shows a carousel transport system that moves the containers in a radial motion. However, it is also possible to have a different type of transport mechanism. For example, a linear transport system can be used. Regardless of the transport system configuration, this invention can be used to inspect containers during the sealing process.

It is further noted that the compression mechanism of the sealing apparatus can vary without affecting the function of this invention. For example, it is possible to use a mechanical means, such as cams, to control the force profile used during the sealing process. It is also possible to use electrically controlled means, such as solenoids, to control the force profile used during the sealing process. Hydraulically powered means may also be used. Regardless of the means of specifying the force profile, this invention can be used to inspect containers during the sealing process.

What is claimed is:

1. A method of in-process container seal inspection comprising the steps of:
 a. setting and displaying maximum and minimum acceptable sealing force limits for each data collection channel via a user interface, wherein the force limits are specified in absolute force units, thereby specifying the force limits used to define a property sealed container without a need for a known good sample;

b. measuring a force applied to a container during a sealing process at multiple instances, each measurement acquired from a unique instance of said data collection channel;

c. comparing the measured force at each said data collection channel to determine if it is within the limits specified, and generating a rejection signal each time said measured force is outside of said limits specified;

d. enabling at least one said data channel; and e. updating and displaying via the user interface to indicate said measured force at each said data collection channel, and providing an indication if said measured force has been outside of said limits specified.

2. The method of claim 1, wherein said maximum and minimum acceptable sealing force limits are specified in pounds.

3. The method of claim 1, wherein said maximum and minimum acceptable sealing force limits are specified in kilograms.

4. A system providing in-process container seal inspection comprising:

a. a plurality of data collection channels;

b. data entry means for selecting maximum and minimum acceptable sealing force limits for each said data collection channel via a user interface, wherein the force limits are specified in absolute force units, thereby specifying the force limits used to define a properly sealed container without a need for a known good sample;

c. a plurality of force measuring means for measuring the force applied to a container seal during the sealing process;

d. means for independently enabling each said data collection channel;

e. Comparison means for determining if measured forces are within user specified limits; and f. said user interface providing the user with an indication of measured absolute force units at each said data collection channel; whereby each said data collection channel receives force data from at least one of said force measuring means.

5. The system of claim 4, wherein said user interface comprises a monitor screen displaying summary information for multiple transport systems, said summary information including status of missing caps, missing stoppers, activation status of each force-monitoring channel, rejection solenoid power status, rejection mechanism activation status, and an indication of the particular instance of transport mechanism to which said summary information pertains.

6. The system of claim 4, wherein the user interface providing the current absolute force units readout is rendered in a form of an analog scale.

7. The system of claim 4, wherein the force measuring means is a plurality of piezoelectric transducers.

8. The system of claim 4, wherein the comparison means is a microprocessor which compares a digitized value corresponding to the measured force with a predetermined set of absolute force limits which are stored in memory.

9. A method for calibrating the system of claim 4, comprising the step of applying a reference force to the sensors, said reference force specified in absolute force units.

* * * * *